United States Patent
Baumgarte et al.

(10) Patent No.: US 11,995,931 B2
(45) Date of Patent: May 28, 2024

(54) UNIVERSAL CREDENTIAL

(71) Applicant: Schlage Lock Company LLC, Carmel, IN (US)

(72) Inventors: Joseph W. Baumgarte, Carmel, IN (US); Aaron J. Schlicht, Golden, CO (US); Alex Lammers, Littleton, CO (US); Nelson Henry, Denver, CO (US); Garett Madole, Austin, TX (US)

(73) Assignee: Schlage Lock Company LLC, Carmel, IN (US)

( * ) Notice: Subject to any disclaimer, the term of this patent is extended or adjusted under 35 U.S.C. 154(b) by 287 days.

(21) Appl. No.: 17/408,367

(22) Filed: Aug. 20, 2021

(65) Prior Publication Data
US 2023/0058482 A1  Feb. 23, 2023

(51) Int. Cl.
*G07C 9/00* (2020.01)
*H04L 9/08* (2006.01)
*H04L 9/32* (2006.01)
*H04W 12/03* (2021.01)
*H04W 12/0471* (2021.01)

(52) U.S. Cl.
CPC ........ *G07C 9/00571* (2013.01); *H04L 9/0841* (2013.01); *H04L 9/3247* (2013.01); *H04W 12/03* (2021.01); *H04W 12/0471* (2021.01)

(58) Field of Classification Search
CPC ...... G07C 9/00571; G07C 2009/00865; H04L 9/0841; H04L 9/3247; H04W 12/03; H04W 12/0471
See application file for complete search history.

(56) References Cited

U.S. PATENT DOCUMENTS 6,374,356 B1  4/2002  Daigneault et al.
7,145,434 B2  12/2006  Mlynarczyk et al.
(Continued)

FOREIGN PATENT DOCUMENTS

EP   3293995 A1   3/2018
WO  2020061567 A1   3/2020

OTHER PUBLICATIONS

International Search Report; International Searching Authority; International Application No. PCT/US2019/052427; dated Feb. 7, 2020; 4 pages.
(Continued)

*Primary Examiner* — Vernal U Brown
(74) *Attorney, Agent, or Firm* — Taft Stettinius & Hollister LLP

(57) ABSTRACT

A method for leveraging a universal credential in an access control system according to one embodiment includes generating, by a cloud system, a CBOR web token for user access to at least one electronic lock, wherein the CBOR web token includes a group tag associated with a set of access rights for a group of users and a cryptographic signature, transmitting the CBOR web token to a user mobile device, receiving, by a first electronic lock, the CBOR web token from the user mobile device for access to a passageway secured by the first electronic lock, verifying an authenticity of the cryptographic signature of the CBOR web token and that the group tag of the CBOR web token is associated with a group authorized to access the passageway secured by the first electronic lock, and unlocking a lock mechanism in response to the verifications.

15 Claims, 4 Drawing Sheets

(56) References Cited

U.S. PATENT DOCUMENTS

| | | |
|---|---|---|
| 7,356,539 B2 | 4/2008 | Brown et al. |
| 7,392,943 B2 | 7/2008 | Rietveld |
| 7,616,091 B2 | 11/2009 | Libin |
| 7,716,489 B1 | 5/2010 | Brandt et al. |
| 7,730,126 B2 | 6/2010 | Crawford |
| 7,822,989 B2 | 10/2010 | Libin et al. |
| 7,873,989 B2 | 1/2011 | Kärkäs et al. |
| 8,015,597 B2 | 9/2011 | Libin et al. |
| 8,063,734 B2 | 11/2011 | Conforti |
| 8,150,374 B2 | 4/2012 | Lowe |
| 8,171,524 B2 | 5/2012 | Micali et al. |
| 8,261,338 B2 | 9/2012 | Brown et al. |
| 8,635,462 B2 | 1/2014 | Ullmann |
| 8,732,457 B2 | 5/2014 | Micali |
| 8,892,771 B2 | 11/2014 | Audebert et al. |
| 9,330,514 B2 | 5/2016 | Kuenzi et al. |
| 9,396,321 B2 | 7/2016 | Davis et al. |
| 9,558,377 B2 | 1/2017 | Wendling et al. |
| 9,794,371 B2 | 10/2017 | Audebert et al. |
| 9,842,446 B2 | 12/2017 | Vecchiotti et al. |
| 9,924,302 B2 | 3/2018 | Plüss |
| 10,116,635 B1 | 10/2018 | Shila et al. |
| 10,171,974 B2 | 1/2019 | Ahearn et al. |
| 10,181,231 B2 | 1/2019 | Kristensen et al. |
| 10,257,190 B2 | 4/2019 | Baty et al. |
| 10,339,747 B2 | 7/2019 | Ishikawa et al. |
| 2013/0061055 A1 | 3/2013 | Schibuk |
| 2013/0227291 A1* | 8/2013 | Ahmed ............... H04L 63/0884 713/168 |
| 2017/0353450 A1 | 12/2017 | Koved et al. |
| 2018/0151013 A1* | 5/2018 | Carstens ............. E05B 47/0001 |
| 2019/0173858 A1* | 6/2019 | Shin ...................... H04L 9/0861 |
| 2020/0100108 A1* | 3/2020 | Everson ................ H04L 9/3247 |
| 2021/0067350 A1 | 3/2021 | McClintock et al. |
| 2021/0136580 A1* | 5/2021 | Bjelcevic .............. H04L 9/3226 |

OTHER PUBLICATIONS

Written Opinion of the International Searching Authority; International Searching Authority; International Application No. PCT/US2019/052427; dated Feb. 7, 2020; 9 pages.

International Search Report; International Searching Authority; International Application No. PCT/US2022/041044; dated Jul. 13, 2023; 4 pages.

Written Opinion of the International Searching Authority; International Searching Authority; International Application No. PCT/US2022/041044; dated Jul. 13, 2023; 5 pages.

* cited by examiner

UNIVERSAL CREDENTIAL

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

One embodiment is a unique system, components, and methods for leveraging a universal credential in an access control system. Other embodiments include apparatuses, systems, devices, hardware, methods, and combinations thereof for leveraging a universal credential in an access control system.

According to an embodiment, a method for leveraging a universal credential in an access control system may include generating, by a cloud system, a CBOR web token for user access to at least one electronic lock, wherein the CBOR web token includes (i) a group tag that is associated with a set of access rights to the at least one electronic lock for a group of users and (ii) a cryptographic signature of the cloud system, transmitting, by the cloud system, the CBOR web token to a user mobile device, receiving, by a first electronic lock of the at least one electronic lock, the CBOR web token from the user mobile device for access to a passageway secured by the first electronic lock, verifying, by the first electronic lock, an authenticity of the cryptographic signature of the CBOR web token, verifying, by the first electronic lock, that the group tag of the CBOR web token is associated with a group authorized to access the passageway secured by the first electronic lock, and unlocking a lock mechanism of the first electronic lock in response to verifying the authenticity of the cryptographic signature of the CBOR web token and verifying that the group tag of the CBOR web token is associated with a group authorized to access the passageway secured by the first electronic lock.

In some embodiments, the method may further include establishing a secure communication session between the user mobile device and the first electronic lock, and receiving the CBOR web token by the first electronic device from the user mobile device may include receiving the CBOR web token in response to establishing the secure communication connection.

In some embodiments, establishing the secure communication session between the user mobile device and the first electronic lock may include establishing a secure Diffie-Hellman session between the user mobile device and the first electronic lock.

In some embodiments, the method may further include transmitting, by the first electronic lock, a device identifier associated with the first electronic lock to the user mobile device, and establishing the secure communication session may include establishing the secure communication session in response to transmitting the device identifier.

In some embodiments, the method may further include generating, by the first electronic lock, an audit in association with unlocking the lock mechanism.

In some embodiments, the CBOR web token may further include an identifier tag that includes a unique identifier of the CBOR web token, and generating the audit may include generating the audit based on the unique identifier of the CBOR web token.

In some embodiments, the CBOR web token may further include a credential tag that includes credential data for backward compatibility with the first electronic lock.

In some embodiments, the CBOR web token may further include an information tag that allows the CBOR web token to virally transmit data from the cloud system to a plurality of electronic locks.

According to another embodiment, an access control system for leveraging a universal credential may include a cloud system comprising at least one first processor and at least one first memory having a first plurality of instructions stored thereon that, in response to execution by the at least one first processor, causes the cloud system to generate a CBOR web token for user access to at least one electronic lock, wherein the CBOR web token includes (i) a group tag that is associated with a set of access rights to the at least one electronic lock for a group of users and (ii) a cryptographic signature of the cloud system, and transmit the CBOR web token to a user mobile device, and a first electronic lock of the at least one electronic lock comprising a lock mechanism, at least one second processor, and at least one second memory having a second plurality of instructions stored thereon that, in response to execution by the at least one second processor, causes the first electronic lock to receive the CBOR web token from the user mobile device for access to a passageway secured by the first electronic lock, verify an authenticity of the cryptographic signature of the CBOR web token, verify that the group tag of the CBOR web token is associated with a group authorized to access the passageway secured by the first electronic lock, and unlock the lock mechanism in response to verification of the authenticity of the cryptographic signature of the CBOR web token and verification that the group tag of the CBOR web token is associated with a group authorized to access the passageway secured by the first electronic lock.

In some embodiments, the second plurality of instructions may further cause the first electronic lock to establish a secure communication session between the user mobile device and the first electronic lock, and to receive the CBOR web token by the first electronic device from the user mobile device may include to receive the CBOR web token in response to establishing the secure communication connection.

In some embodiments, to establish the secure communication session between the user mobile device and the first electronic lock may include to establish a secure Diffie-Hellman session between the user mobile device and the first electronic lock.

In some embodiments, the second plurality of instructions may further cause the first electronic lock to transmit a device identifier associated with the first electronic lock to the user mobile device, and to establish the secure communication session may include to establish the secure communication session in response to transmission of the device identifier.

In some embodiments, the CBOR web token may further include an identifier tag that includes a unique identifier of the CBOR web token, and the second plurality of instructions may further cause the first electronic lock to generate an audit in association with unlocking the lock mechanism based on the unique identifier of the CBOR web token.

In some embodiments, the CBOR web token may further include a credential tag that includes credential data for backward compatibility with the first electronic lock.

In some embodiments, the CBOR web token may further include an information tag that allows the CBOR web token to virally transmit data from the cloud system to a plurality of electronic locks.

According to yet another embodiment, a method for leveraging a universal credential in an access control system may include generating, by a cloud system, a CBOR web token for user access to a passageway secured by an electronic lock, cryptographically signing, by the cloud system, the CBOR web token with a private cryptographic key of the cloud system, encrypting, by the cloud system, the CBOR web token using a public cryptographic key of the electronic lock, transmitting, by the cloud system, the signed and encrypted CBOR web token to a user mobile device, receiving, by the electronic lock, the signed and encrypted CBOR web token from the user mobile device for access to the passageway secured by the electronic lock, decrypting, by the electronic lock, the signed and encrypted CBOR web token using a private cryptographic key of the electronic lock, verifying, by the electronic lock, an authenticity of the cryptographic signature of the CBOR web token, and unlocking a lock mechanism of the electronic lock in response to decrypting the signed and encrypted CBOR web token and verifying the authenticity of the cryptographic signature of the CBOR web token.

In some embodiments, the method may further include receiving, by the user mobile device and from the electronic lock, a device identifier associated with the electronic lock, and selecting, by the user mobile device, the signed and encrypted CBOR web token based on the device identifier, and wherein receiving the signed and encrypted CBOR web token from the user mobile device may include receiving the signed and encrypted CBOR web token in response to selecting the signed and encrypted CBOR web token.

In some embodiments, the method may further include establishing a secure communication session between the user mobile device and the electronic lock, and wherein receiving the signed and encrypted CBOR web token from the user mobile device may include receiving the signed and encrypted CBOR web token in response to establishing the secure communication connection.

In some embodiments, establishing the secure communication session between the user mobile device and the electronic lock may include establishing a secure Diffie-Hellman session between the user mobile device and the electronic lock.

In some embodiments, the method may further include generating, by the first electronic lock, an audit in association with unlocking the lock mechanism.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
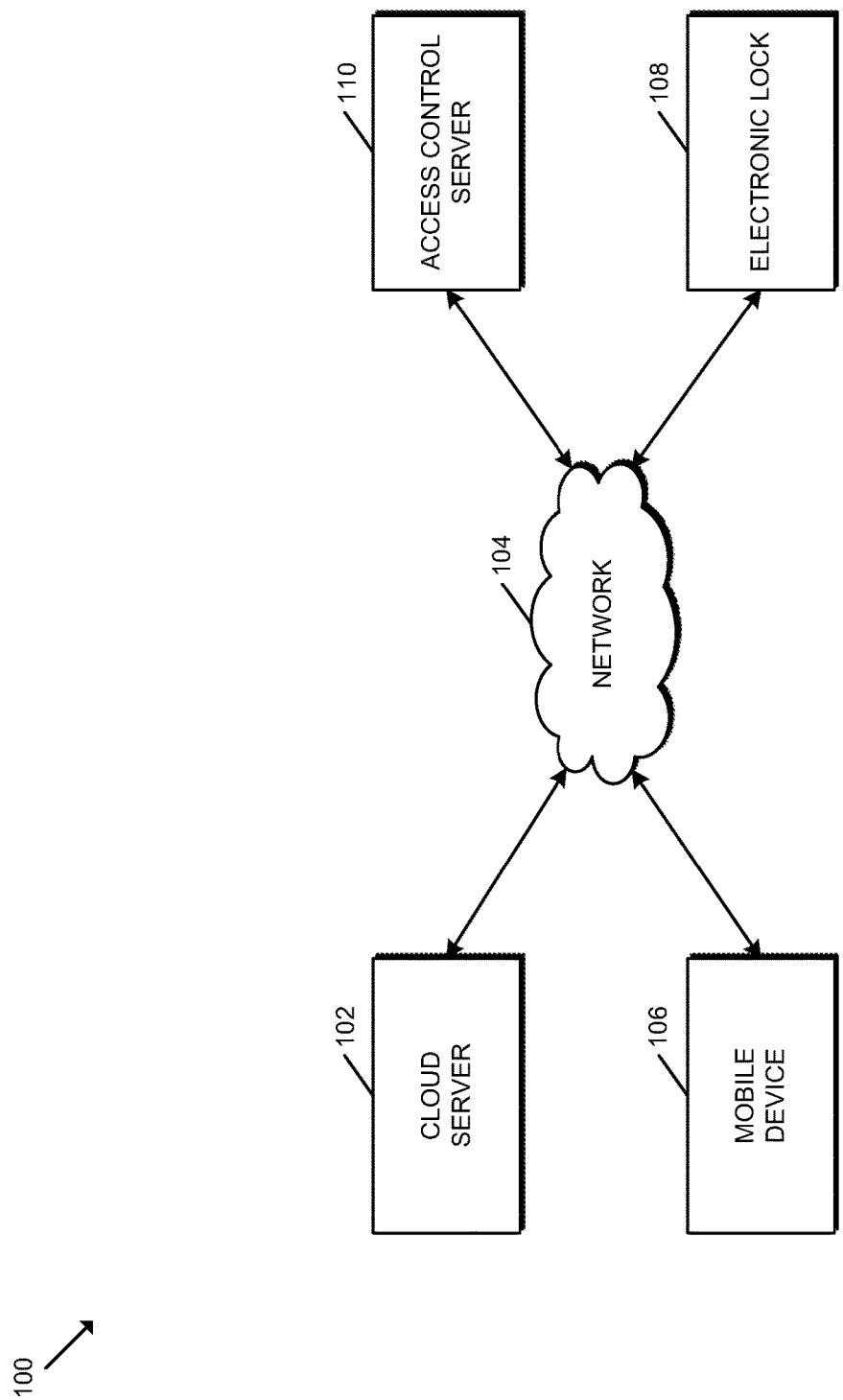
FIG. 1 is a simplified block diagram of at least one embodiment of an access control system for leveraging a universal credential.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for leveraging a universal credential includes a cloud server 102, a network 104, a mobile device 106, an electronic lock 108, and an access control server 110.

As described in detail below, in the illustrative embodiment, the access control system 100 may allow for using a universal credential including, for example, the ability to work in any situation with any device (e.g., electronic lock, IoT device, etc.). In some embodiments, the universal credential allows for natural extensibility by inserting different credentials (e.g., by virtue of credential data) or tag additional parameters into the payload. For example, in some embodiments, the universal credential (e.g., in the form of a CBOR web token) may include a BLE/Bluetooth credential and one or more traditional access credentials (e.g., emulated swipe credentials and/or passive credentials). Accordingly, the universal credential allows for simpler lock features such that future locks do not require a fully comprehensive whitelist database. In some embodiments, the access control system 100 may include a whitelist "backup" database with an "assumed connectivity" credential such that if the payload has not expired and contains the correct markers, the door unlocks without the credential having previously been stored to the whitelist database.

More specifically, in the illustrative embodiment, the access control system 100 may utilize a CBOR web token that includes tags to confidentially communicate authentic identity and authorization to a device (e.g., an electronic lock), which provides a natural extensibility and future protection, as new tags can be added without requiring a change in the process, development of a new token architecture, and/or redesign of the access control system 100. It should be appreciated that the universal credential technologies described herein may be used for physical access control and may have multiple "levels" of security associated with the credential (e.g., a "lower-security" option/method and a "higher-security" option/method).

In some embodiments, a "lower-security" option allows for a generic token that has a "group" tag embedded in or otherwise included in the token, which maps to certain (or all) portals (e.g., secured passageways) of a building (e.g., exterior/interior entryways). For example, there could be a group tag that assigns the user to a particular group that conveys access to certain doors without having to continuously update the electronic locks. Such a feature would allow, for example, for electronic access in cases of emergency such as a fire. For example, the fire crew could have a single token that conveys access to every portal for a predetermined period of time, such that expiration could have a short or long time as defined by the security needs of the user or building administrator.

In some embodiments, a "higher-security" option allows for unique tokens for each door, which may prevent the token from being used on other devices (i.e., because the token is encrypted for that particular device using that particular device's public cryptographic key). In other words, in some embodiments, unique tokens may be generated for each device, potentially for each time access is granted. Further, in such embodiments, the mobile device may cache and track each of the "higher-security" tokens if offline access is desired (i.e., when no cloud access is available). In some embodiments, the typically greater frequency at which the higher-security token involves the mobile device communicating with the cloud server allows for additional opportunities. For example, in some embodiments, the system may utilize additional tags to pass additional information to the specific device to virally pass information, perform updates, potentially retrieve information, etc. Further, using either security level/option, it should be appreciated that backward compatibility may be supported using one or more tags. For example, one tag could be a standard/traditional PACS credential (e.g., 26A, 40x, etc.), and another tag may be an identifier tag that includes a unique identifier (e.g., of the credential/token) to create an audit.

It should be appreciated that the cloud server 102, the network 104, the mobile device 106, the electronic lock 108, and/or the access control server 110 may be embodied as any type of device or collection of devices suitable for performing the functions described herein.

More specifically, in the illustrative embodiment, the cloud server 102 may be embodied as one or more servers and/or systems configured to generate the web tokens (e.g., CBOR web tokens) to be used as universal credentials, encrypting/signing the tokens, distributing tokens to relevant mobile devices 106, and/or otherwise performing the functions described herein. In cloud-based embodiments, the cloud server 102 may be embodied as a server-ambiguous computing solution, for example, that executes a plurality of instructions on-demand, contains logic to execute instructions only when prompted by a particular activity/trigger, and does not consume computing resources when not in use. That is, the cloud server 102 may be embodied as a virtual computing environment residing "on" a computing system (e.g., a distributed network of devices) in which various virtual functions (e.g., Lambda functions, Azure functions, Google cloud functions, and/or other suitable cloud/virtual functions) may be executed corresponding with the functions of the cloud server 102 described herein. For example, when an event occurs (e.g., data is transferred to the cloud server 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the cloud server 102), the appropriate virtual function(s) may be executed to perform the actions before eliminating the instance of the virtual function(s). Further, although the cloud server 102 is described herein as being one or more computing devices within a cloud computing environment, in other embodiments, the cloud server 102 may be embodied as, or include, one or more computing devices residing outside of a cloud computing environment.

The network 104 may be embodied as any type of communication network(s) capable of facilitating communication between the various devices of the access control system 100. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, near-range wireless communication networks, long-range wireless communication networks, or a combination thereof.

The mobile device 106 may be embodied as any type of device capable of executing an application and otherwise performing the functions described herein. For example, in the illustrative embodiment, the mobile device 106 is configured to communicate with the cloud server 102 to receive one or more universal credentials (e.g., CBOR web tokens) for storage and subsequent use with one or more corresponding electronic locks 108 and/or other credential-processing devices. It should be appreciated that the application(s) executed by the mobile device 106 may be embodied as one or more types of applications suitable for performing the functions described herein. In particular, in some embodiments, each of the applications may be embodied as a mobile application (e.g., a smartphone application), a cloud-based application, a web application, a thin-client application, and/or another type of application. In some embodiments, an application may serve as a client-side interface (e.g., via a web browser) for a web-based application or service. It should be appreciated that the mobile device 106 may be configured to communicate via one or more wireless communication technologies and protocols depending on the particular embodiment. For example, in various embodiments, the mobile device 106 may include circuitry, firmware, and/or software for communicating via one or more of Wi-Fi, Bluetooth/BLE, ZigBee, Z-wave, WiMAX, NFC, Thread, Matter, HomeKit, Ultra-Wideband (UWB), RADAR, LIDAR, and/or another suitable communication technology.

In the illustrative embodiment, the electronic lock 108 may be embodied as any type of device capable of controlling and/or facilitating access through a passageway (e.g., at least in part). For example, in some embodiments, the electronic lock 108 may be embodied as a mortise lock, a cylindrical lock, a tubular lock, or another type of lock device (e.g., an exit device, a door operator, an auto-operator, a motorized latch/bolt, a barrier control device, a gate controller, a peripheral controller of a barrier to a passageway, etc.). Accordingly, in some embodiments, the electronic lock 108 may include a lock mechanism configured to be positioned in a locked state in which access to the passageway is denied or in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any other mechanism suitable for controlling access through a passageway in other embodiments.

Depending on the particular embodiment, the electronic lock 108 may include a credential reader or be electrically/communicatively coupled to a credential reader configured to communicative with credentials. In some embodiments, the electronic lock 108 may have an access control database stored thereon for locally performing access control decisions associated with user access (e.g., for "offline" use). Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the access control server 110).

It should appreciated that the universal credential may be described as a virtual credential stored on the mobile device 106 and/or described as an "active" credential in that the mobile device 106 is self-powered. Further, in some embodiments, the electronic lock 108 may also be configured to process one or more "passive" credentials powered by radio frequency (RF) signals received from a credential reader (e.g., credential cards). In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz.

As described herein, the access control server 110 may be communicatively coupled to the electronic lock 108 and may be configured to manage credentials of the access control system 100. For example, depending on the particular embodiment, the access control server 110 may be responsible for ensuring that electronic lock 108 (and/or other electronic locks) have updated authorized credentials, access control lists, device parameters, and/or other suitable data. Additionally, in some embodiments, the access control server 110 may receive security data, audit data, raw sensor data, and/or other suitable data from the electronic lock 108 for management of the access control system 100. In some embodiments, one or more of the devices of the access control server 110 may be embodied as an online server or a cloud-based server. Further, in some embodiments, the access control server 110 may communicate with multiple electronic locks 108 at a single site (e.g., a particular building) and/or across multiple sites. That is, in such embodiments, the access control server 110 may be configured to receive data from electronic locks 108 distributed across a single building, multiple buildings on a single campus, or across multiple locations.

It should be appreciated that each of the cloud server 102, the network 104, the mobile device 106, the electronic lock 108, and/or the access control server 110 may be embodied as one or more computing devices similar to the computing device 200 described below in reference to FIG. 2. For example, each of the cloud server 102, the network 104, the mobile device 106, the electronic lock 108, and/or the access control server 110 may include a processing device 202 and a memory 206 having stored thereon operating logic 208 for execution by the processing device 202 for operation of the corresponding device.

Although only one cloud server 102, one network 104, one mobile device 106, one electronic lock 108, and one access control server 110 are shown in the illustrative embodiment of FIG. 1, the system 100 may include multiple cloud servers 102, networks 104, mobile devices 106, electronic locks 108, and/or access control servers 110 in other embodiments. For example, as indicated above, the cloud server 102 may be embodied as multiple servers in a cloud computing environment in some embodiments. Further, each user may be associated with a different mobile device 106 (and different universal credential(s)) in some embodiments.

Figure 2:
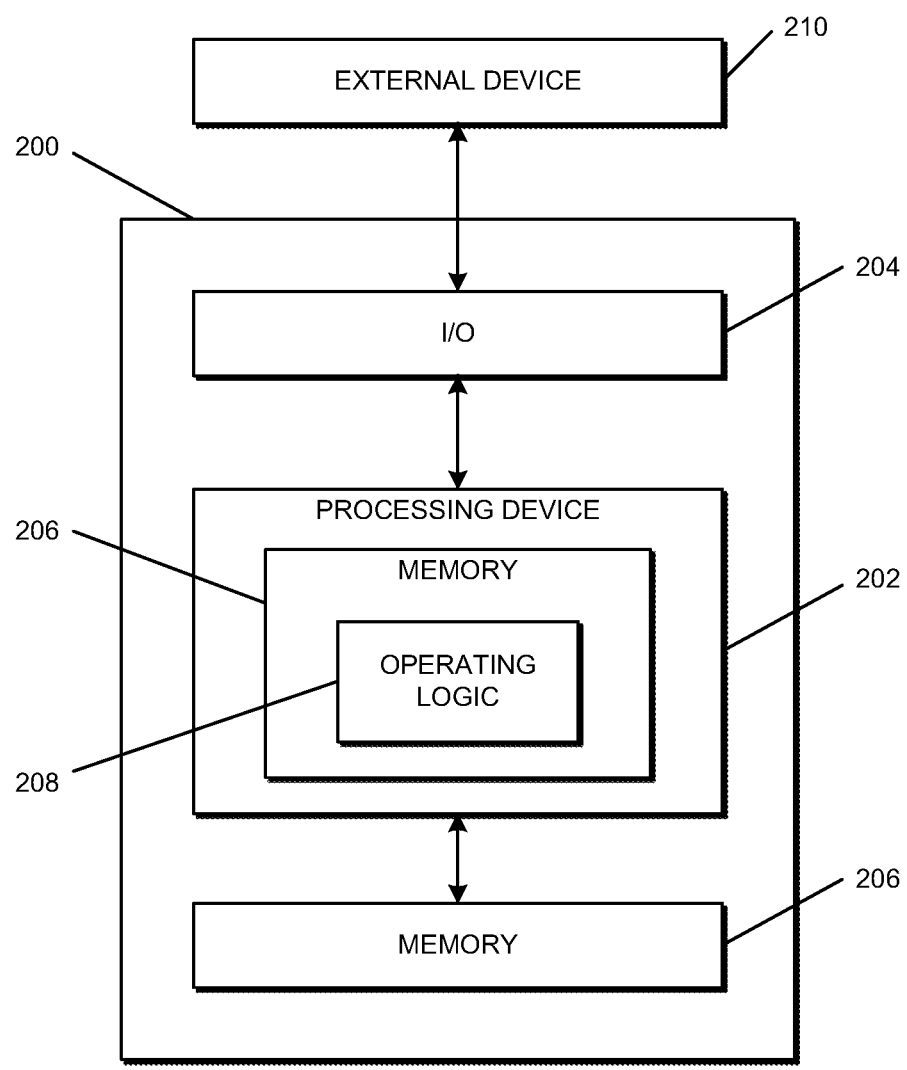
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a cloud server 102, network 104, mobile device 106, electronic lock 108, and/or access control server 110 illustrated in FIG. 1. Depending on the particular embodiment, computing device 200 may be embodied as an electronic lock, reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port (e.g., RS-232, RS-485, CAN bus), parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet (e.g., including PoE), Bluetooth® (e.g., including BLE), Wi-Fi®, WiMAX, ZigBee, Z-Wave, NFC, Thread, Matter, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the cloud server 102, the network 104, the mobile device 106, the electronic lock 108, and/or the access control server 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices.

Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

Figure 3:
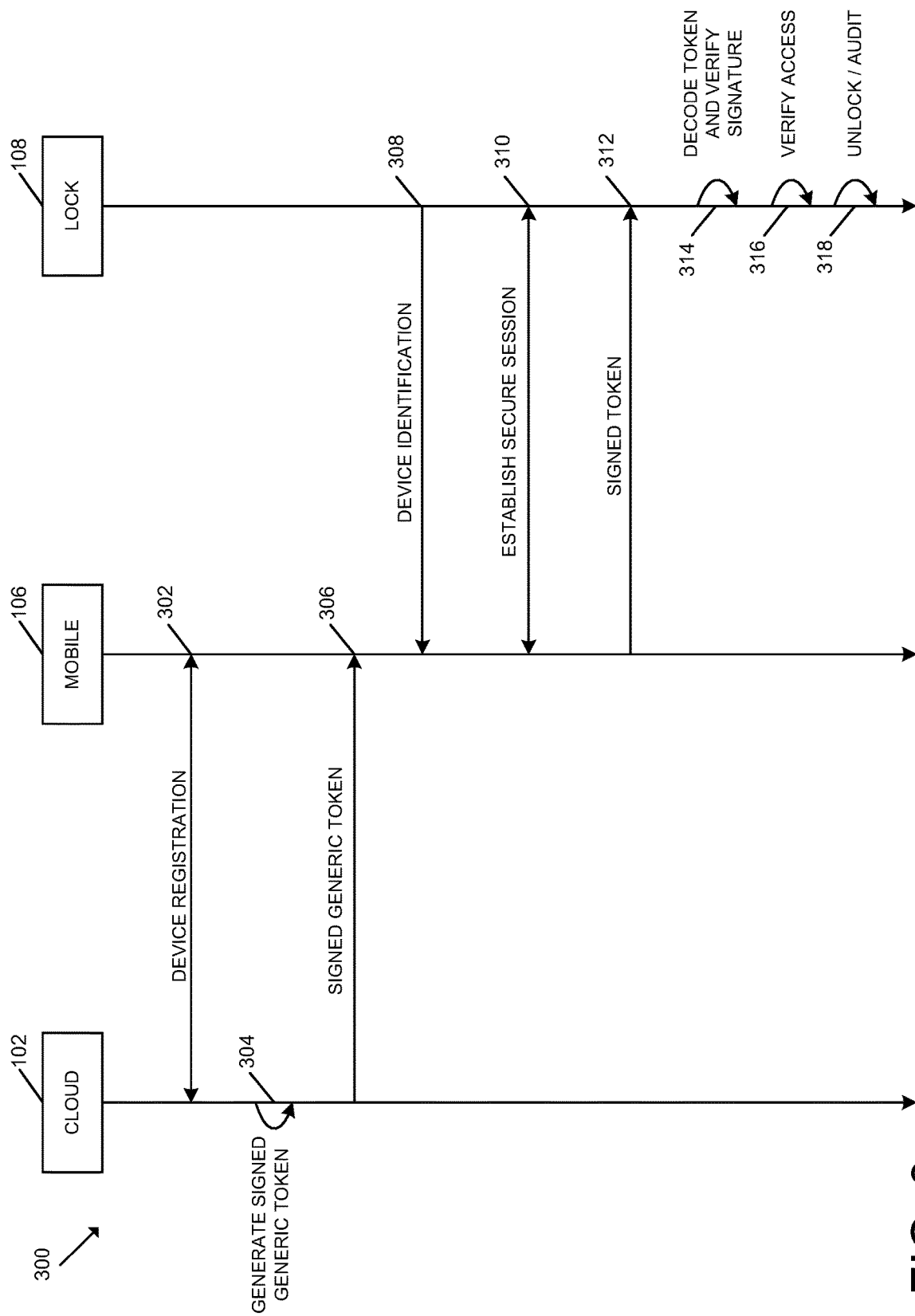
FIG. 3 is a simplified flow diagram of at least one embodiment of a method for leveraging the universal credential.

Referring now to FIG. 3, in use, the access control system 100 may execute a method 300 for leveraging a universal credential. It should be appreciated that the particular flows of the method 300 are illustrated by way of example, and such flows may be combined or divided, added or removed, and/or reordered in whole or in part depending on the particular embodiment, unless stated to the contrary. In some embodiments, the method 300 of FIG. 3 may correspond with the "lower-security" method described above.

The illustrative method 300 begins with flow 302 in which the cloud server 102 and the mobile device 106 communicate with one another to "register" the mobile device 106 (or the user thereof) for access to one or more electronic locks 108. In doing so, it should be appreciated that the mobile device 106 may share one or more mobile device identifiers, password information, personal user information, and/or other data associated with enrollment/registration of the mobile device 106 for access to a particular electronic lock 108, a set of electronic locks 108, a class/type of electronic lock 108, and/or otherwise.

In flow 304, the cloud server 102 generates and cryptographically signs a Concise Binary Object Representation (CBOR) web token for user access to the at least one electronic lock 108. Although the illustrative token is described herein as a CBOR web token, it should be appreciated that the access control system 100 may utilize a different type and/or format of token as the universal credential in other embodiments. For example, in some embodiments, the universal credential may be embodied as a JavaScript Object Notation (JSON) web token and/or other type of web token. In the illustrative embodiment, the CBOR web token is cryptographically signed using a private cryptographic key of the cloud server 102. Further, it should be appreciated that the web token may be cryptographically signed using any suitable cryptographic algorithm. For example, in some embodiments, the token may be signed using ECDSA, RSA, DSA, ElGamal, Rabin, and/or another cryptographic digital signature algorithm.

It should be appreciated that the CBOR web token may include one or more tags or fields to convey various data. For example, in some embodiments, the CBOR web token may include a group tag that is associated with a set of access rights to one or more electronic locks 108 for a group of users. In other words, the group tag may map to certain (or all) portals or electronic locks 108 of a building/structure, and the inclusion of the a particular group identifier in the group tag is indicative of the user's access rights to those corresponding portals or electronic locks 108. A group tag may include characteristics that associate the user with a particular group for group-based access control decisions. For example, without using a "whitelist," the group tags may be evaluated by respective electronic locks 108 to allow an engineer to enter engineer-related facilities, allow a male to enter a male university dormitory, allow a female to enter a female university dormitory, and/or otherwise allow group-affiliated access without evaluating or determining the particular identity of the user.

In another embodiment, the CBOR web token may include a credential tag that includes credential data for backward compatibility with legacy electronic lock devices 108 (e.g., as a software "retrofit"). For example, one tag could be associated with a standard/traditional PACS credential (e.g., 26A, 40x, etc.). Further, in some embodiments, the CBOR web token may include an identifier tag that includes a unique identifier of the CBOR web token and/or entity of the access control system 100, which may be used by the access control system 100 for generating audits corresponding with a particular web token, mobile device 106, electronic lock 108, or otherwise. In yet another embodiment, the CBOR web token may include an information tag that allows the web token to virally transmit data from the cloud server 102 to one or more (e.g., a plurality of) electronic locks 108, perform updates on the electronic locks 108, receive information from the electronic locks 108 and/or mobile devices 106, and/or otherwise transmit access control data.

Accordingly, it should be appreciated that a single CBOR web token can convey different access rights for a user or mobile device 106 (e.g., group-affiliated access for multiple different electronic locks 108) using various tags/fields. A particular CBOR web token may include different tags/fields that can be interpreted differently by different electronic locks 108 depending on the particular context and/or access requirements of that particular electronic lock 108. It should be further appreciated that, in some embodiments, the CBOR web token may include a command (e.g., in addition to an express or implied command to unlock a door), such as to "lock down," "connect to the Internet to get updated instructions," and/or another suitable command. Further, in some embodiments, one or more types of commands (e.g., "lock down") may override one or more commands, functions, or tags of the CBOR web token (e.g., overriding an unlock command/function). Additionally, in some embodiments, the CBOR token may be configured to expire (after some predefined/designated period or at a predefined/designated time) to allow for renewal of the token to ensure that the user should have continued access to the secured passageway/door.

In flow 306, the cloud server 102 transmits the signed CBOR web token to the mobile device 106, which may store the CBOR web token in the memory thereof in anticipation of a subsequent access attempt by a user of the mobile device 106. The user may approach the electronic lock 108 and the mobile device 106 and/or the electronic lock 108 may determine the user's intent to access the electronic lock 108. It should be appreciated that the user intent to access may be determined based on the user's indication of intent and/or inferred by the electronic lock 108 using any suitable intent determination algorithm.

In flow 308, the electronic lock 108 transmits a device identifier associated with the electronic lock 108 to the mobile device 106, and in flow 310, a secure communication session is established between the electronic lock 108 and the mobile device 106. For example, in the illustrative embodiment, a secure Diffie-Hellman session is established between the electronic lock 108 and the mobile device 106. In other embodiments, however, it should be appreciated that the electronic lock 108 and the mobile device 106 may otherwise establish a secure communication session.

In flow 312, the mobile device 106 transmits the signed CBOR web token to the electronic lock 108. It should be appreciated that, in some embodiments, the mobile device 106 may determine the particular web token to transmit to the particular electronic lock 108 based on the device identifier of the electronic lock 108. In some embodiments, the mobile device 106 essentially functions as an intermediary for transmittal of the CBOR web token. Further, in some embodiments, the mobile device 106 and the electronic lock 108 may include additional layers of security. For example, a challenge/response protocol may be used to prevent replay attacks and/or a speed of light test may be used to prevent a relay attack.

In flow 314, the electronic lock 108 decodes the CBOR web token received from the mobile device 106 and verifies the authenticity of the cryptographic signature of the web token (e.g., using the corresponding public cryptographic key of the cloud server 102). It should be appreciated that the public cryptographic key may be identified based on PKI, a certificate authority, and/or using another suitable technique. The cryptographic signature serves to prove that the CBOR web token is an authentic token generated by the cloud server 102.

In flow 316, the electronic lock 108 verifies whether the CBOR web token includes a tag that corresponds with group access to the passageway secured by the electronic lock 108. In other words, the electronic lock 108 verifies that a group tag of the web token is associated with a group authorized to access the passageway secured by the electronic lock 108. As indicated above, the group tag(s) allows the electronic lock 108 to provide access to a particular user (or, more specifically, a mobile device 106) without having previous knowledge of the user and without cross-referencing a whitelist.

In flow 318, the electronic lock 108 unlocks the lock mechanism to permit access to the passageway secured by the electronic lock 108 if the cryptographic signature of the CBOR web token is determined to be authentic and the group tag of the web token is associated with a group authorized to have access. Further, the electronic lock 108 may generate an audit in association with and/or representative of receipt of the web token, successful unlocking of the lock mechanism, unsuccessful unlocking of the lock mechanism (e.g., due to denied access permissions), and/or another type of audit. The audit data may be saved to the electronic lock 108, transmitted to the access control server 110, and/or passed back to the mobile device 106 (e.g., via a corresponding tag of the web token) depending on the particular embodiment.

Although the flows 302-318 are described in a relatively serial manner, it should be appreciated that various flows of the method 300 may be performed in parallel in some embodiments.

Figure 4:
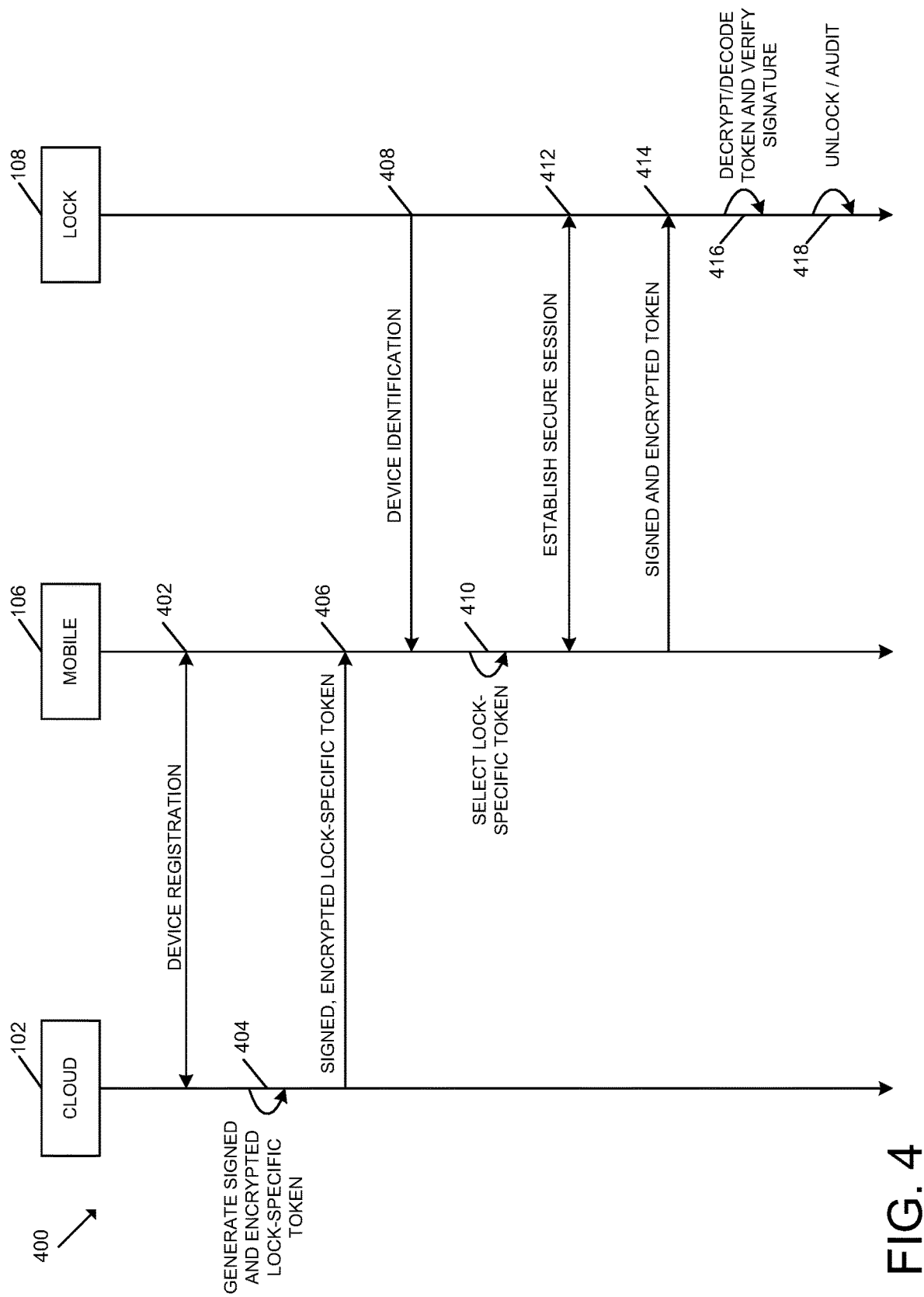
FIG. 4 is a simplified flow diagram of at least one embodiment of another method for leveraging the universal credential.

Referring now to FIG. 4, in use, the access control system 100 may execute a method 400 for leveraging a universal credential. It should be appreciated that the particular flows of the method 400 are illustrated by way of example, and such flows may be combined or divided, added or removed, and/or reordered in whole or in part depending on the particular embodiment, unless stated to the contrary. In some embodiments, the method 400 of FIG. 4 may correspond with the "higher-security" method described above.

The illustrative method 400 begins with flow 402 in which the cloud server 102 and the mobile device 106 communicate with one another to "register" the mobile device 106 (or the user thereof) for access to one or more electronic locks 108. In doing so, it should be appreciated that the mobile device 106 may share one or more mobile device identifiers, password information, personal user information, and/or other data associated with enrollment/registration of the mobile device 106 for access to a particular electronic lock 108, a set of electronic locks 108, a class/type of electronic lock 108, and/or otherwise.

In flow 404, the cloud server 102 generates a cryptographically signed and encrypted lock-specific CBOR web token for user access to a particular electronic lock 108. Although the illustrative token is described herein as a CBOR web token, it should be appreciated that the access control system 100 may utilize a different type and/or format of token as the universal credential in other embodiments. For example, in some embodiments, the universal credential may be embodied as a JSON web token and/or other type of web token. In the illustrative embodiment, the CBOR web token is cryptographically signed using a private cryptographic key of the cloud server 102. Further, it should be appreciated that the web token may be cryptographically signed using any suitable cryptographic algorithm. For example, in some embodiments, the token may be signed using ECDSA, RSA, DSA, ElGamal, Rabin, and/or another cryptographic digital signature algorithm. Similarly, it should be appreciated that the web token may be encrypted using any suitable cryptographic algorithm. For example, in the illustrative embodiment, the CBOR web token is encrypted using an Elliptic Curve Integrated Encryption Scheme (ECIES). However, in other embodiments, the token may be encrypted using ECC, DSA, RSA, ElGamal, and/or another asymmetric cryptography algorithm.

In some embodiments, it should be appreciated that the CBOR web token may include one or more tags or fields to convey various data similar to the tags described above. However, in the illustrative embodiment, the web token is lock-specific and, therefore, any group tags associated with group-based access may be ignored by the electronic lock 108 upon validation. It should be further appreciated that, in some embodiments, the CBOR web token may include a command similar to that described above in reference to the method 300 of FIG. 3. Additionally, in some embodiments, the CBOR token may be configured to expire (after some predefined/designated period or at a predefined/designated time) to allow for renewal of the token to ensure that the user should have continued access to the secured passageway/door.

In flow 406, the cloud server 102 transmits the signed and encrypted lock-specific CBOR web token to the mobile device 106, which may store the CBOR web token in the memory thereof in anticipation of a subsequent access attempt by a user of the mobile device 106. In particular, in the illustrative embodiment, the mobile device 106 may include a token database and/or other data structure that stores the lock-specific tokens in association with the various electronic locks 108 (e.g., based on the device identifiers of the electronic locks 108). For example, if the user has access to one thousand different electronic locks 108 via the "higher-security" method, the mobile device 106 may store one thousand different lock-specific signed and encrypted CBOR web tokens in association with those corresponding electronic locks 108 (e.g., in the token database).

The user may approach the electronic lock 108 and the mobile device 106 and/or the electronic lock 108 may determine the user's intent to access the electronic lock 108. It should be appreciated that the user intent to access may be determined based on the user's indication of intent and/or inferred by the electronic lock 108 using any suitable intent determination algorithm.

In flow 408, the electronic lock 108 transmits a device identifier associated with the electronic lock 108 to the mobile device 106, and in flow 410, the mobile device 106 selects the appropriate lock-specific CBOR web token based on the device identifier (e.g., from the token database of the mobile device 106). In flow 412, a secure communication session is established between the electronic lock 108 and the mobile device 106. For example, in the illustrative embodiment, a secure Diffie-Hellman session is established between the electronic lock 108 and the mobile device 106. In other embodiments, however, it should be appreciated that the electronic lock 108 and the mobile device 106 may otherwise establish a secure communication session.

In flow 414, the mobile device 106 transmits the signed and encrypted lock-specific CBOR web token to the electronic lock 108. As indicated above, in some embodiments, the mobile device 106 and the electronic lock 108 may include additional layers of security. For example, a challenge/response protocol may be used to prevent replay attacks and/or a speed of light test may be used to prevent a relay attack.

In flow 416, the electronic lock 108 decrypts and decodes the CBOR web token received from the mobile device 106. It should be appreciated that the electronic lock 108 may decrypt the web token using the corresponding private cryptographic key of the electronic lock 108. The electronic lock 108 also verifies the authenticity of the cryptographic signature of the web token (e.g., using the corresponding public cryptographic key of the cloud server 102). It should be appreciated that the public cryptographic key may be identified based on PKI, a certificate authority, and/or using another suitable technique. The cryptographic signature serves to prove that the CBOR web token is an authentic token generated by the cloud server 102.

In flow 418, the electronic lock 108 unlocks the lock mechanism to permit access to the passageway secured by the electronic lock 108 if the CBOR web token is successfully decrypted and the cryptographic signature of the CBOR web token is determined to be authentic. Further, the electronic lock 108 may generate an audit in association with and/or representative of receipt of the web token, successful unlocking of the lock mechanism, unsuccessful unlocking of the lock mechanism (e.g., due to denied access permissions), and/or another type of audit. The audit data may be saved to the electronic lock 108, transmitted to the access control server 110, and/or passed back to the mobile device 106 (e.g., via a corresponding tag of the web token) depending on the particular embodiment.

Although the flows 402-418 are described in a relatively serial manner, it should be appreciated that various flows of the method 400 may be performed in parallel in some embodiments.

What is claimed is:

1. A method for leveraging a universal credential in an access control system, the method comprising:
generating, by a cloud system, a Concise Binary Object Representation (CBOR) web token for user access to at least one electronic lock, wherein the CBOR web token includes (i) a group tag that is associated with a set of access rights to the at least one electronic lock for a group of users and (ii) a cryptographic signature of the cloud system;
transmitting, by the cloud system, the CBOR web token to a user mobile device;
receiving, by a first electronic lock of the at least one electronic lock, the CBOR web token from the user mobile device for access to a passageway secured by the first electronic lock;
verifying, by the first electronic lock, an authenticity of the cryptographic signature of the CBOR web token;
verifying, by the first electronic lock, that the group tag of the CBOR web token is associated with a group authorized to access the passageway secured by the first electronic lock; and
unlocking a lock mechanism of the first electronic lock in response to verifying the authenticity of the cryptographic signature of the CBOR web token and verifying that the group tag of the CBOR web token is associated with a group authorized to access the passageway secured by the first electronic lock.

2. The method of claim 1, further comprising establishing a secure communication session between the user mobile device and the first electronic lock; and
wherein receiving the CBOR web token by the first electronic device from the user mobile device comprises receiving the CBOR web token in response to establishing the secure communication connection.

3. The method of claim 2, wherein establishing the secure communication session between the user mobile device and the first electronic lock comprises establishing a secure Diffie-Hellman session between the user mobile device and the first electronic lock.

4. The method of claim 3, further comprising transmitting, by the first electronic lock, a device identifier associated with the first electronic lock to the user mobile device; and
wherein establishing the secure communication session comprises establishing the secure communication session in response to transmitting the device identifier.

5. The method of claim 1, further comprising generating, by the first electronic lock, an audit in association with unlocking the lock mechanism.

6. The method of claim 5, wherein the CBOR web token further includes an identifier tag that includes a unique identifier of the CBOR web token; and
wherein generating the audit comprises generating the audit based on the unique identifier of the CBOR web token.

7. The method of claim 1, wherein the CBOR web token further includes a credential tag that includes credential data for backward compatibility with the first electronic lock.

8. The method of claim 1, wherein the CBOR web token further includes an information tag that allows the CBOR web token to virally transmit data from the cloud system to a plurality of electronic locks.

9. An access control system for leveraging a universal credential, the access control system comprising:
a cloud system comprising at least one first processor and at least one first memory having a first plurality of instructions stored thereon that, in response to execution by the at least one first processor, causes the cloud system to:
generate a Concise Binary Object Representation (CBOR) web token for user access to at least one electronic lock, wherein the CBOR web token includes (i) a group tag that is associated with a set of access rights to the at least one electronic lock for a group of users and (ii) a cryptographic signature of the cloud system; and
transmit the CBOR web token to a user mobile device; and
a first electronic lock of the at least one electronic lock comprising a lock mechanism, at least one second processor, and at least one second memory having a second plurality of instructions stored thereon that, in response to execution by the at least one second processor, causes the first electronic lock to:
receive the CBOR web token from the user mobile device for access to a passageway secured by the first electronic lock;
verify an authenticity of the cryptographic signature of the CBOR web token;
verify that the group tag of the CBOR web token is associated with a group authorized to access the passageway secured by the first electronic lock; and
unlock the lock mechanism in response to verification of the authenticity of the cryptographic signature of the CBOR web token and verification that the group tag of the CBOR web token is associated with a group authorized to access the passageway secured by the first electronic lock.

10. The access control system of claim 9, wherein the second plurality of instructions further causes the first electronic lock to establish a secure communication session between the user mobile device and the first electronic lock; and
wherein to receive the CBOR web token by the first electronic device from the user mobile device comprises to receive the CBOR web token in response to establishing the secure communication connection.

11. The access control system of claim 10, wherein to establish the secure communication session between the user mobile device and the first electronic lock comprises to establish a secure Diffie-Hellman session between the user mobile device and the first electronic lock.

12. The access control system of claim 11, wherein the second plurality of instructions further causes the first electronic lock to transmit a device identifier associated with the first electronic lock to the user mobile device; and
wherein to establish the secure communication session comprises to establish the secure communication session in response to transmission of the device identifier.

13. The access control system of claim 9, wherein the CBOR web token further includes an identifier tag that includes a unique identifier of the CBOR web token; and
wherein the second plurality of instructions further causes the first electronic lock to generate an audit in association with unlocking the lock mechanism based on the unique identifier of the CBOR web token.

14. The access control system of claim 9, wherein the CBOR web token further includes a credential tag that includes credential data for backward compatibility with the first electronic lock.

15. The access control system of claim 9, wherein the CBOR web token further includes an information tag that allows the CBOR web token to virally transmit data from the cloud system to a plurality of electronic locks.

* * * * *